(12) United States Patent
Huang et al.

(10) Patent No.: US 11,087,661 B2
(45) Date of Patent: Aug. 10, 2021

(54) DISPLAY DEVICE HAVING CURVED PORTION

(71) Applicant: InnoLux Corporation, Miao-Li County (TW)

(72) Inventors: Yu-Chia Huang, Miao-Li County (TW); Yuan-Lin Wu, Miao-Li County (TW); Kuan-Feng Lee, Miao-Li County (TW); Tsung-Han Tsai, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 16/292,327

(22) Filed: Mar. 5, 2019

(65) Prior Publication Data

US 2020/0286416 A1 Sep. 10, 2020

(51) Int. Cl.
*G09G 3/20* (2006.01)
*G09F 9/30* (2006.01)

(52) U.S. Cl.
CPC ............... *G09G 3/20* (2013.01); *G09F 9/301* (2013.01); *G09G 2300/026* (2013.01); *G09G 2300/0408* (2013.01); *G09G 2300/0426* (2013.01); *G09G 2380/02* (2013.01)

(58) Field of Classification Search
CPC ............... G09G 3/20; G09G 2300/026; G09G 2300/0408; G09G 2300/0426; G09G 2380/02; G09F 9/301
See application file for complete search history.

(56) References Cited

U.S. PATENT DOCUMENTS

| | | | |
|---|---|---|---|
| 9,626,900 B2* | 4/2017 | Anzai | G09G 3/3266 |
| 10,254,863 B2* | 4/2019 | Shin | G06F 1/1677 |
| 10,483,341 B2* | 11/2019 | Jung | G09G 3/20 |
| 2009/0051640 A1* | 2/2009 | Tanaka | H01L 27/3276 345/92 |
| 2011/0057861 A1* | 3/2011 | Cok | H01L 51/5209 345/1.3 |
| 2016/0035812 A1 | 2/2016 | Kwon | |
| 2016/0064466 A1 | 3/2016 | Son | |
| 2016/0066409 A1 | 3/2016 | Kwon | |
| 2016/0087024 A1 | 3/2016 | Son | |
| 2016/0093644 A1 | 3/2016 | Ki | |
| 2016/0190522 A1 | 6/2016 | Lee | |
| 2017/0115542 A1* | 4/2017 | Oh | G02F 1/136286 |
| 2019/0165004 A1* | 5/2019 | Lou | H01L 29/7869 |

* cited by examiner

*Primary Examiner* — Stephen G Sherman
(74) *Attorney, Agent, or Firm* — Winston Hsu (57) ABSTRACT

A display device includes a substrate and a plurality of gate driving units. The substrate has at least one curved portion with a curved side edge, and the plurality of gate driving units are disposed along the curved side edge.

17 Claims, 11 Drawing Sheets

DISPLAY DEVICE HAVING CURVED PORTION

BACKGROUND OF THE DISCLOSURE

1. Field of the Disclosure

The present disclosure relates to a display device, and more particularly to a curved display device including at least one curved portion.

2. Description of the Prior Art

Curved display devices have become the focus of display technology. Since the display device is curved, some conductive lines (or circuits) disposed in the display panel may be curved, the resistances of the conductive lines (or circuits) may be changed, which may affect the transmission efficiency.

SUMMARY OF THE DISCLOSURE

In some embodiments, a display device includes a substrate and a plurality of gate driving units. The substrate has at least one curved portion with a curved side edge, and the plurality of gate driving units are disposed along the curved side edge.

In some embodiments, a tiled display device includes a first substrate, a second substrate, and a plurality of driving units. The first substrate has at least one first curved portion with a curved side edge, the second substrate has at least one second curved portion with a curved side edge, and the plurality of gate driving unit are disposed along the curved side edge of the at least one first curved portion or the curved side edge of the least one second curved portion.

In some embodiments, the display device includes a substrate and a plurality of gate driving units. The substrate has a longitudinal side edge, and the plurality of gate driving units are disposed along the longitudinal side edge, wherein the gate driving units are arranged in a manner having at least two unit distances.

These and other objectives of the present disclosure will no doubt become obvious to those of ordinary skill in the art after reading the following detailed description of the embodiment that is illustrated in the various figures and drawings.

DETAILED DESCRIPTION

The present disclosure may be understood by reference to the following detailed description, taken in conjunction with the drawings as described below. For purposes of illustrative clarity understood, various drawings of this disclosure show a portion of the electronic device, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to".

When an element or layer is referred to as being "disposed on", "connected with", or "connected to" another element or layer, it can be directly on or directly disposed on, or connected with (to) the other element or layer, or intervening elements or layers may be presented. In contrast, when an element is referred to as being "directly disposed on" or "directly connected with (to)" another element or layer, there are no intervening elements or layers presented.

The terms "about", "substantially", "approximately", "equal", or "same" generally mean within 20% of a given value or range, or mean within 10%, 5%, 3%, 2%, 1%, or 0.5% of a given value or range.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

The technical features in different embodiments described in the following can be replaced, recombined, or mixed with one another to constitute another embodiment without departing from the spirit of the present disclosure.

Figure 1:
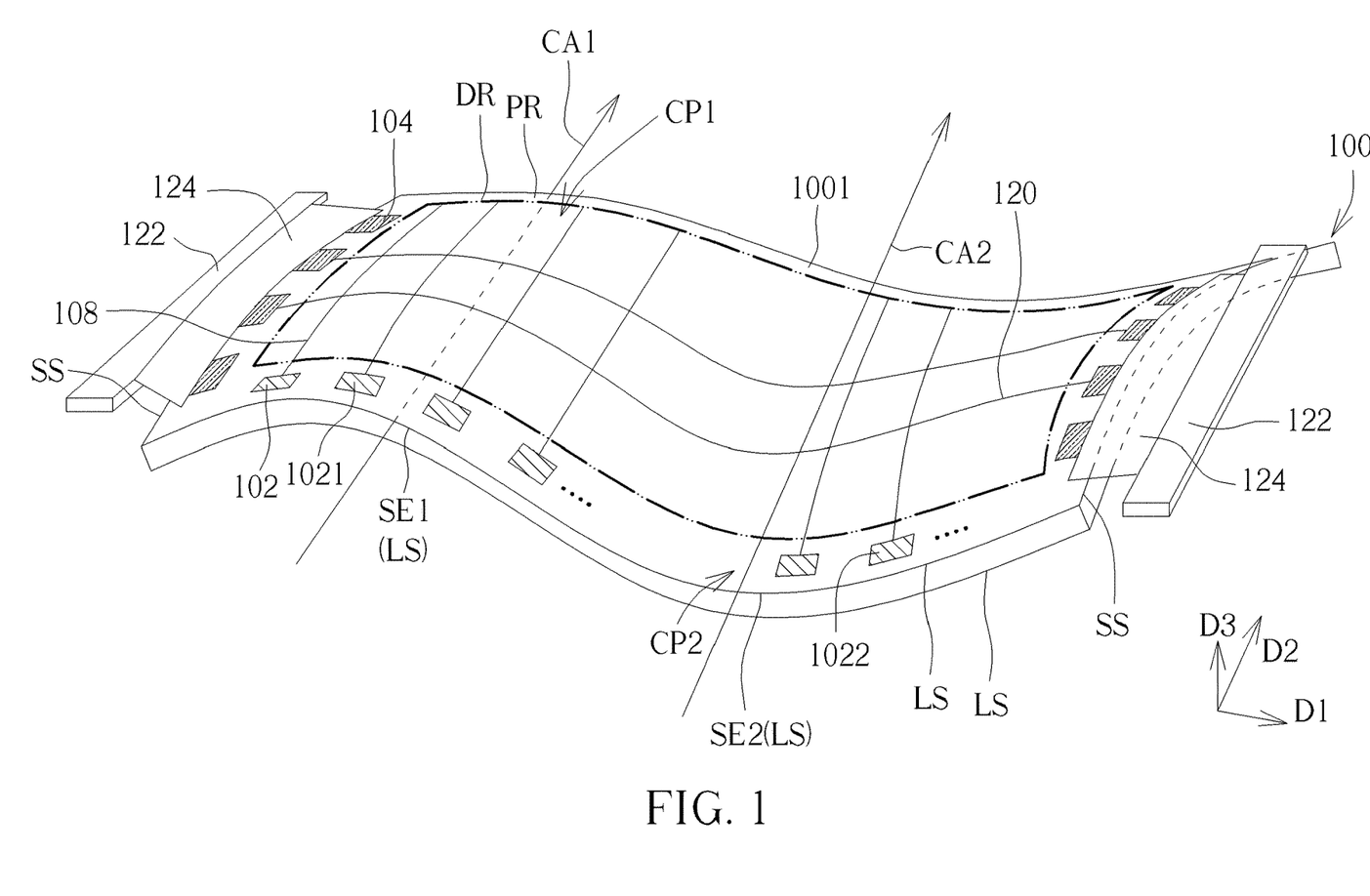
FIG. 1 is a schematic diagram illustrating a substrate of a display device according to a first embodiment of the present disclosure.
Figure 2:
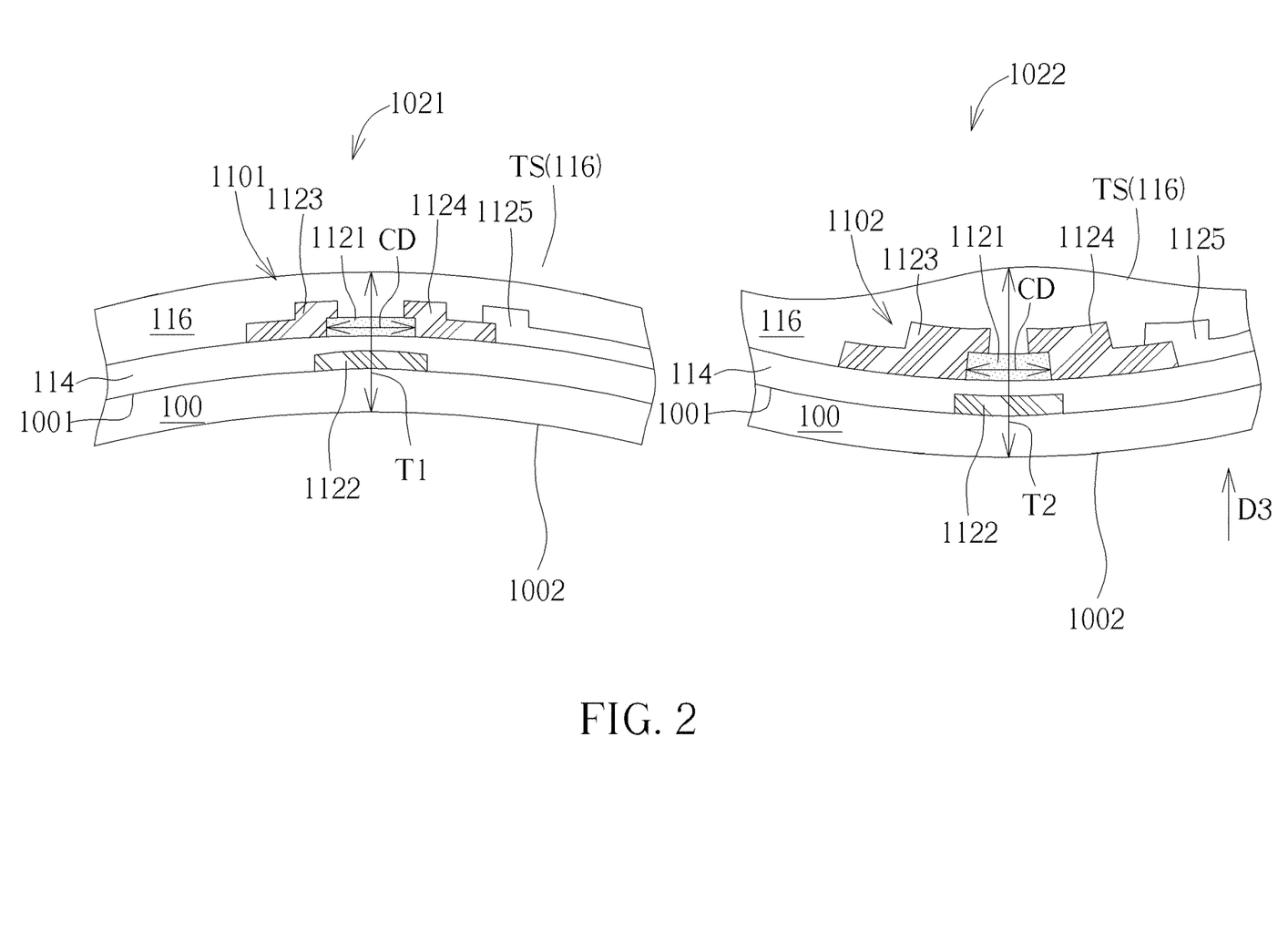
FIG. 2 is a schematic diagram illustrating a cross-sectional view of a first transistor disposed in a tensile stress accumulated location and a second transistor disposed in a compressive stress accumulated location according to the first embodiment.
Figure 3:
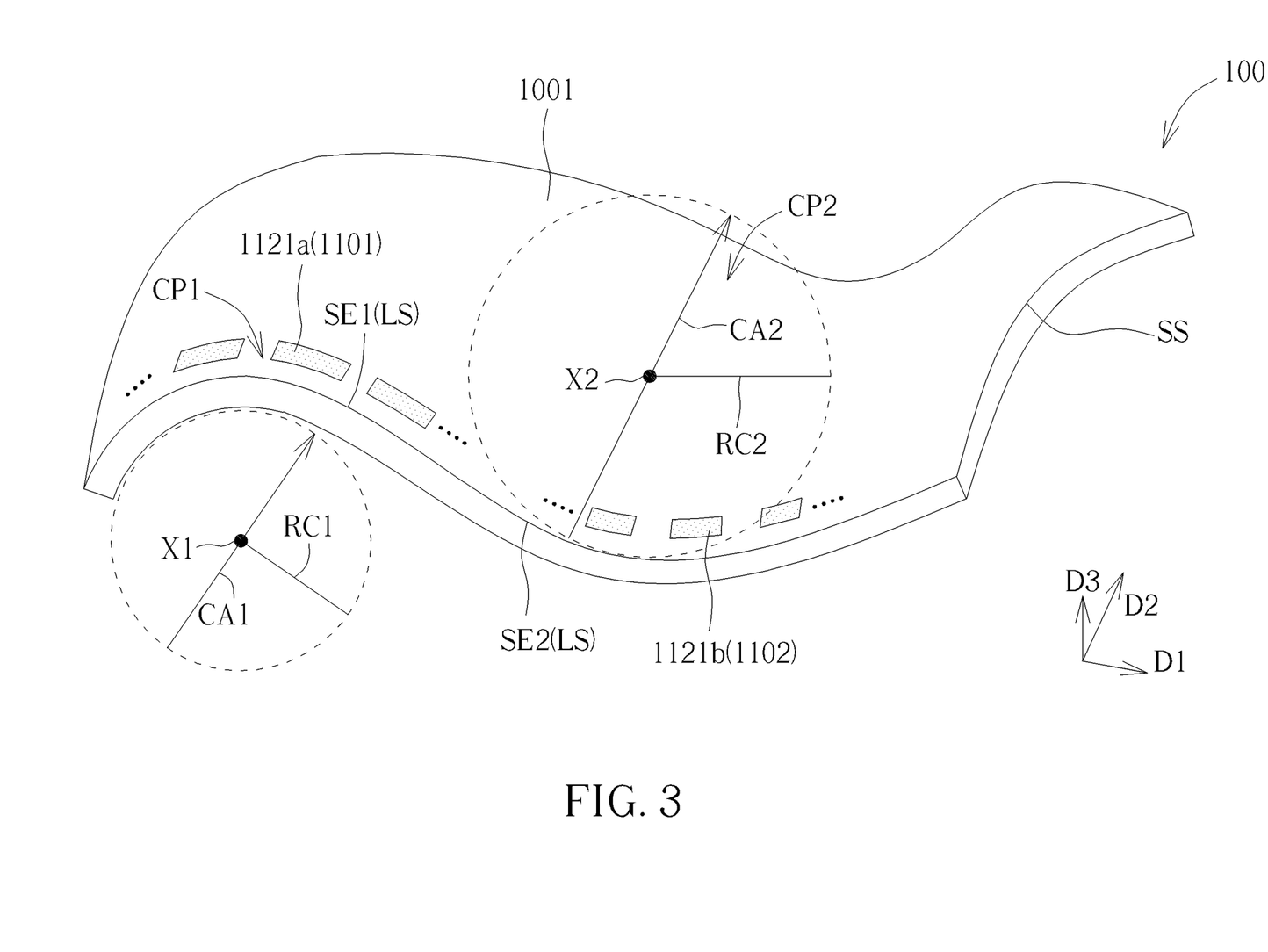
FIG. 3 is a schematic diagram illustrating a plurality of semiconductor layers of thin film transistors according to the first embodiment.

Referring to FIG. 1 to FIG. 3, FIG. 1 is a schematic diagram illustrating a substrate of a display device according to a first embodiment, FIG. 2 is a schematic diagram illustrating a cross-sectional view of a first transistor disposed in a tensile stress accumulated location and a second transistor disposed in a compressive stress accumulated location according to the first embodiment, and FIG. 3 is a schematic diagram illustrating a plurality of semiconductor layers of thin film transistors according to the first embodiment. The display device may include liquid crystal, light emitting diode (LED), mini-LED, micro-LED, organic light emitting diode (OLED), quantum dot LED (QLED or QD-LED), or other suitable materials. As shown in FIG. 1, the display device may include a substrate 100, at least one gate driving unit 102, and at least one source driving unit 104. The substrate 100 may be a thin film transistor (TFT) substrate or array substrate, and the plurality of gate driving units 102 and the at least one source driving unit 104 may be disposed on (or bonded on) the substrate 100. In some embodiments, the circuit layer (includes signal lines, thin film transistors (TFT)) and/or light emitting elements (not shown) may be disposed on the substrate 100, but not limited thereto. The substrate 100 may include flexible substrate (or plastic substrate), but not limited thereto. The material of the substrate 100 may include polyimide (PI), polycarbonate (PC), or polyethylene terephthalate (PET), but not limited thereto. In some embodiments, the substrate 100 has at least one curved portion (such as a first curved portion CP1 and/or a second curved portion CP2, but not limited thereto) with a curved side edge (such as first curved side edge SE1 and/or second curved side edge SE2). In some embodiments, the curved side edge is a portion of a longitudinal side edge LS of the substrate 100. For example, as shown in FIG. 1, the substrate 100 has a plurality of longitudinal side edges LS, and the first curved side edge SE1 and the second curved side edge SE2 may be portions of one of the longitudinal side edge LS. In some embodiments, the substrate 100 may have a plurality of horizontal side edges SS different from the longitudinal side edges LS. One of the longitudinal side edges LS may be adjacent to (or connected with) at least one of the horizontal side edges SS. In some embodiments, an angle between an extension direction of one of the longitudinal side edges LS and an extension direction of one of the horizontal side edges SS may be in a range from 45° to 135° (45°≤angle≤135°), but not limited thereto. For example (referring to FIG. 1 and FIG. 2,), the substrate 100 may have four longitudinal side edges LS and four horizontal side edges SS. Two of four horizontal side edges SS are corresponding to the top surface 1001 of the substrate 100, which disposed opposite to each other, and other two of four horizontal side edges SS are corresponding to the bottom surface 1002 of the substrate 100, which disposed opposite to each other. Two of four longitudinal side edges LS are corresponding to the top surface 1001 of the substrate 100, which disposed opposite to each other, and other two of four horizontal side edges SS are corresponding to the bottom surface 1002 of the substrate 100, which disposed opposite to each other. One of the longitudinal side edges LS corresponded to the top surface 1001 may be adjacent to (or connected with) two horizontal side edges SS corresponded to the top surface 1001, but not limited thereto. One of the longitudinal side edges LS corresponded to the bottom surface 1002 may be adjacent to (or connected with) two horizontal side edges SS corresponded to the bottom surface 1002, but not limited thereto.

Before describing the substrate 100, a first direction D1, a second direction D2, and a third direction D3 are explained herein. The first direction D1 may be an extension direction of one of the longitudinal side edges LS, the second direction D2 may be an extension direction of one of the horizontal side edges SS, but not limited thereto. A top surface 1001 of the substrate 100 has a projection surface, and a normal direction of the projection surface may be a third direction D3. In some embodiments, the first direction D1 and the second direction D2 may be approximately perpendicular to the third direction D3, but not limited thereto.

As shown in FIG. 1, the substrate 100 may include a plurality of curved portions (such as a first curved portion CP1 and a second curved portion CP2, but not limited thereto). The first curved portion CP1 may be curved corresponding to a first curve axis CA1, and the second curved portion CP2 may be curved corresponding to a second curve axis CA2. In some embodiments (such as FIG. 1), the first curved portion CP1 and the second curved portion CP2 may have different curving directions. For example (in FIG. 1), the first curved portion CP1 has a convex surface, and a first curved side edge SE1 of the first curved portion CP1 may be similar to the reverse "U" shape when the observer views from the second direction D2, and a curvature center X1 of the first curved side edge SE1 is shown in FIG. 3. In some embodiments (such as FIG. 1), the second curved portion CP2 has a concave surface, and a second curved side edge SE2 of the second curved portion CP2 may be similar to "U" shape when the observer views from the second direction D2, and a curvature center X2 of the second curved side edge SE2 is shown in FIG. 3. In some embodiments, a tensile stress is accumulated in the first curved portion CP1 having a convex surface, and a compressive stress is accumulated in the second curved portion CP2 having a concave surface. As shown in FIG. 3, the first curved side edge SE1 and the second curved side edge SE2 may respectively have a radius of curvature RC1 and a radius of curvature RC2, and the radius of curvature RC1 may be the same as or different from the radius of curvature RC2. As shown in FIG. 1, the first curved side edge SE1 and the second curved side edge SE2 may be portions of the longitudinal side edge LS. For example, at least one of the longitudinal side edges LS is in s shape, but not limited thereto. In some embodiments, at least one of the longitudinal side edges LS is in other shapes (such m shape, w shape or wave shape).

Referring to FIG. 1, the substrate 100 has a plurality of horizontal side edges SS different from the longitudinal side edge LS, the horizontal side edges SS and the longitudinal side edges LS are disposed at different sides of the substrate 100, and at least one of the horizontal side edges SS may be connected to two longitudinal side edges LS. It should be noted that, a curvature of one of the horizontal side edges SS may be less than a curvature of the first curved side edges SE1 (and/or the second curved side edge SE2), the curvature of the horizontal side edges SS is not equal to zero, and "curvature" is the inverse of "radius of curvature". In some embodiments, the horizontal side edge SS may be similar to the reverse "U" shape when the observer views along the first direction D1, but not limited thereto. In some embodiments (not shown), the horizontal side edge SS may be similar to "U" shape when the observer views along the first direction D1. In some embodiments, the horizontal side edge SS may be similar to the "-" shape or other shapes when the observer views along the first direction D1. In some embodiments (such as FIG. 1), the longitudinal side edges LS may have longer length, and the horizontal side edges SS may have shorter length, but not limited thereto. In some embodiments (not shown), the longitudinal side edges LS may have shorter length, and the horizontal side edges SS may have longer length."

As shown in FIG. 1, the display device may include a plurality of gate driving units 102, which may be disposed along the curved side edge, or the plurality of gate driving units 102 are disposed adjacent to the curved side edge. It should be noted that, the plurality of gate driving units 102 are disposed along the curved side edge may mean that "at least part of the plurality of gate driving units 102 disposed on the substrate 100 are disposed along the curved side edge". In some embodiments, at least two of the plurality of gate driving units 102 are disposed along the curved side edge, but not limited thereto. For example (in FIG. 1), the plurality of gate driving units 102 may be disposed on the top surface 1001 of the substrate, and the plurality of driving units 102 may be disposed along the first curved side edge SE1 and/or the second curved side edge SE2. In some embodiments, at least one of the gate driving units 102 may be a gate driver on panel (GOP), and at least one of the gate driving units 102 may include at least one thin film transistor, but not limited thereto. In some embodiments (not shown), at least one of the gate driving units 102 may include an integrated circuit (or IC chip), such as chip on panel (COP), but not limited thereto. In some embodiments, the substrate 100 may include a display region DR (a region inside the double dotted dashed line) and a peripheral region PR (a region outside the double dotted dashed line) surrounding the display region DR. In some embodiments, the gate driving units 102 may be disposed in the peripheral region PR.

The display device may include a plurality of gate lines 108 disposed on the substrate 100, and one of the gate lines 108 is electrically connected to one of the gate driving units 102. In some embodiments, the gate lines 108 may be disposed in the display region DR and extended to the peripheral region PR. At least one of the gate lines 108 may be curved or extend along an extension direction of one of the horizontal side edges SS. Since the curvature of the horizontal side edge SS is smaller, the gate lines 108 may be curved with smaller curvature as well.

In some embodiments, at least one of the gate driving units 102 may include at least one thin film transistor (TFT). As shown in FIG. 1 and FIG. 2, the first curved portion CP1 may bear the tensile stress, a first gate driving unit 1021 may be disposed adjacent to the first curved side edge SE1 of the first curved portion CP1, and the first gate driving unit 1021 may include a first transistor 1101. In addition, the second curved portion CP2 may bear the compressive stress, a second gate driving unit 1022 may be disposed adjacent to the second curved side edge SE2 of the second curved portion CP2, and the second gate driving unit 1022 may include a second transistor 1102. The first transistor 1101 and the second transistor 1102 may respectively include a semiconductor layer 1121, a gate electrode 1122, a source electrode 1123, and a drain electrode 1124. The drain electrode 1124 of the first transistor 1101 and the drain electrode 1124 of the second transistor 1102 may be electrically connected to the corresponding gate line 108. For example, since the drain electrodes 1124 and the gate lines 108 may be formed in different processes, a conductive line 1125 connected to one of the drain electrodes 1124 may be electrically connected to the corresponding gate line 108 through at least one via, but not limited thereto. In some embodiments, the drain electrode 1124 and the conductive line 1125 may formed in the same process. In some embodiments, a gate insulating layer 114 may be disposed between the gate electrodes 1122 and the semiconductor layer 1121, and a protection layer 116 may be disposed on or cover the semiconductor layers 1121, the source electrodes 1123, the drain electrodes 1124 and the gate lines 108.

As shown in FIG. 2, a tensile stress is accumulated in a first location of the substrate 100, and a compressive stress is accumulated in the second location of the substrate 100. In some embodiments, the thickness T2 corresponding in the second location may be greater than or equal to the thickness T1 corresponding in the first location, but not limited thereto. The thickness T1 corresponding in the first location may be defined from the bottom surface 1002 of the substrate 100 to the top surface TS of the protection layer 116 in the third direction D3, the thickness T2 corresponding in the second location is defined from the bottom surface 1002 of the substrate 100 to the top surface TS of the protection layer 116 in the third direction D3, and the first location and the second location may have the same cross-sectional structure. More specifically, the number and type of layers (or elements) in the first location are the same as the number and type of layers (or elements) in the second location. The thickness T1 and/or the thickness T2 may be a maximum thickness measured from a local scanning electron microscope (SEM) image corresponding in the first location and/or the second location.

For example, as shown in FIG. 2, the first transistor 1101 is disposed in a first location, and the tensile stress is accumulated in the first location, and the second transistor 1102 is disposed in a second location of the substrate 100, and the compressive stress is accumulated in the second location. The thickness T1 in the first location and the thickness T2 in the second location may be measured corresponding to the same structure including the same stacking layer. For example, the thickness T1 may be measured from a cross-sectional structure in the first location, which has at least part of the semiconductor layers 1121 of the first transistor 1101 overlapped with at least part of the gate electrode 1122 of the first transistor 1101, and thickness T2 may be measured from a cross-sectional structure in the second location, which has at least part of the semiconductor layers 1121 of the second transistor 1101 overlapped with at least part of the gate electrode 1122 of the second transistor 1102, but not limited thereto.

Figure 4:
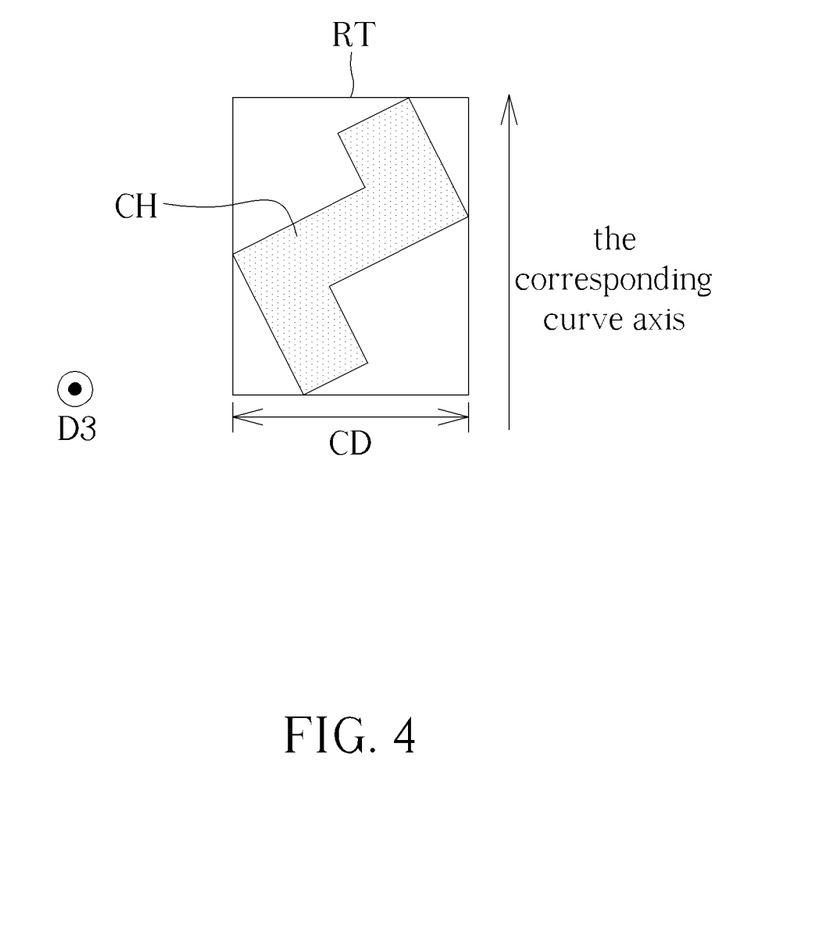
FIG. 4 is a schematic diagram illustrating a method of defining a channel dimension.

As shown in FIG. 3, in some embodiments, an area of a channel 1121a of the first transistor 1101 is different from an area of a channel 1121b of the second transistor 1102, but not limited thereto. The area of the channel may be defined as an area of the channel projected to the substrate 100. The channel CH may be a portion of the semiconductor layer, which is between the source electrode and the drain electrode, and the semiconductor layer is overlapped with the gate electrode in the third direction D3. For example, in FIG. 3, the area of the channel 1121a of the first transistor 1101 may be greater than the area of the channel 1121b of the second transistor 1102. As shown in FIG. 4, in the top view direction (or third direction D3), a shape of a channel CH may include a polygon shape or a curved shape, but not limited thereto. Referring to FIG. 4, it is a schematic diagram illustrating a method of defining a channel dimension CD.

In the third direction D3, an outline of the channel CH may be circumscribed with a rectangle RT having two edges approximately parallel to the corresponding curve axis (such as the first curve axis CA1, the second curve axis CA2, or other curve axes), and two edges are approximately perpendicular to the corresponding curve axis, the rectangle RT may be a minimum rectangle that can contain an entire channel CH, and the channel dimension CD may be defined by a width of one of the above edges perpendicular to the corresponding curve axis.

In some embodiments (FIG. 3), the first transistor 1101 may be disposed in the first curved portion CP1, and the second transistor 1102 may be disposed in the second curved portion CP2, the first transistor 1101 may be stretched, and the second transistor 1102 may be compressed, but not limited thereto. In some embodiments, the area of the semiconductor layer 1121a (or the channel dimension CD) of the first transistor 1101 may be greater than or equal to the area of the semiconductor layer 1121b (or the channel dimension CD) of the second transistor 1102. In some embodiments, the area of the semiconductor layer 1121a (or channel dimension CD) of the first transistor 1101 may be greater than or equal to the area of the semiconductor layer 1121b (or channel dimension CD) of the second transistor 1102 before curving.

Referring to FIG. 1, the display device may include at least one source driving unit 104 disposed in the peripheral region PR, and at least one source driving unit 104 disposed adjacent to at least one of the horizontal side edges SS. In addition, the display device may include a plurality of data lines 120 disposed on the substrate 100, and one of the plurality of data lines 120 is electrically connected to one of at least one source driving unit 104. As shown in FIG. 1, the data lines 120 are disposed in the display region DR and extend to the peripheral region PR. In some embodiments, two ends of at least one of the data lines 120 may respectively be electrically connected to one of at least one source driving unit 104, but not limited thereto. In some embodiments, one end of at least one of the data lines 120 may be electrically connected to one of at least one source driving unit 104. The data lines 120 may be curved or extend along an extension direction of the longitudinal side edge LS (including the first curved side edge SE1 and/or the second curved side edge SE2). Since the curvatures of the first curved side edge SE1 (and/or the second curved side edge SE2) is greater, the data lines 120 may be curved with greater curvatures as well, but it is not limited. In some embodiments, the curvature of the gate lines 108 may be less than the curvatures of the data lines 120.

In some embodiments, at least one source driving unit 104 may be one of integrated circuit (IC), thin film transistor, and chip on film (COF) structure, but not limited thereto. As shown in FIG. 1, the display device may include a chip on glass (COG) structure, at least one source driving unit 104 may be integrated circuit, the source driving unit 104 may include some bonding bumps (not shown), and one of the bonding bumps may be electrically connected to one of the bonding pads (not shown) disposed on the substrate 100. One of the bonding pads may be electrically connected to one of the data lines 120, one of the data lines 120 may respectively be electrically connected to at least one TFT (such as switching TFT) of the sub-pixels (not shown), but not limited thereto. In some embodiments, the source driving unit 104 may be electrically connected to a printed circuit board (PCB) 122 by a printed flexible circuit (FPC) 124, but not limited thereto. Since the curvature of at least one of the horizontal side edges SS is smaller, the design of disposing the source driving units 104 along or adjacent to the at least one of the horizontal side edges SS can reduce the possibility of cracking in the ICs of the source driving units 104 or cracking in the PCBs 122.

In some embodiments, the data lines 120 are curved along (or parallel to) the first curved side edge SE1 and the second curved side edge SE2 having greater curvatures, and the gate lines 108 are curved along (or parallel to) the horizontal side edge SS having the smaller curvature. Since the electric charging ability of the source driving units 104 may be greater than the electric charging ability of the gate driving units 102, the electric charging ability of the source driving units 104 can compensate for the degradation of a signal transmission quality of the data lines 120 when the data lines 120 have greater curvatures. Also, since the gate lines 108 have the smaller curvature, the signal transmission quality in the gate lines 108 can be maintained, but not limited thereto.

Figure 5:
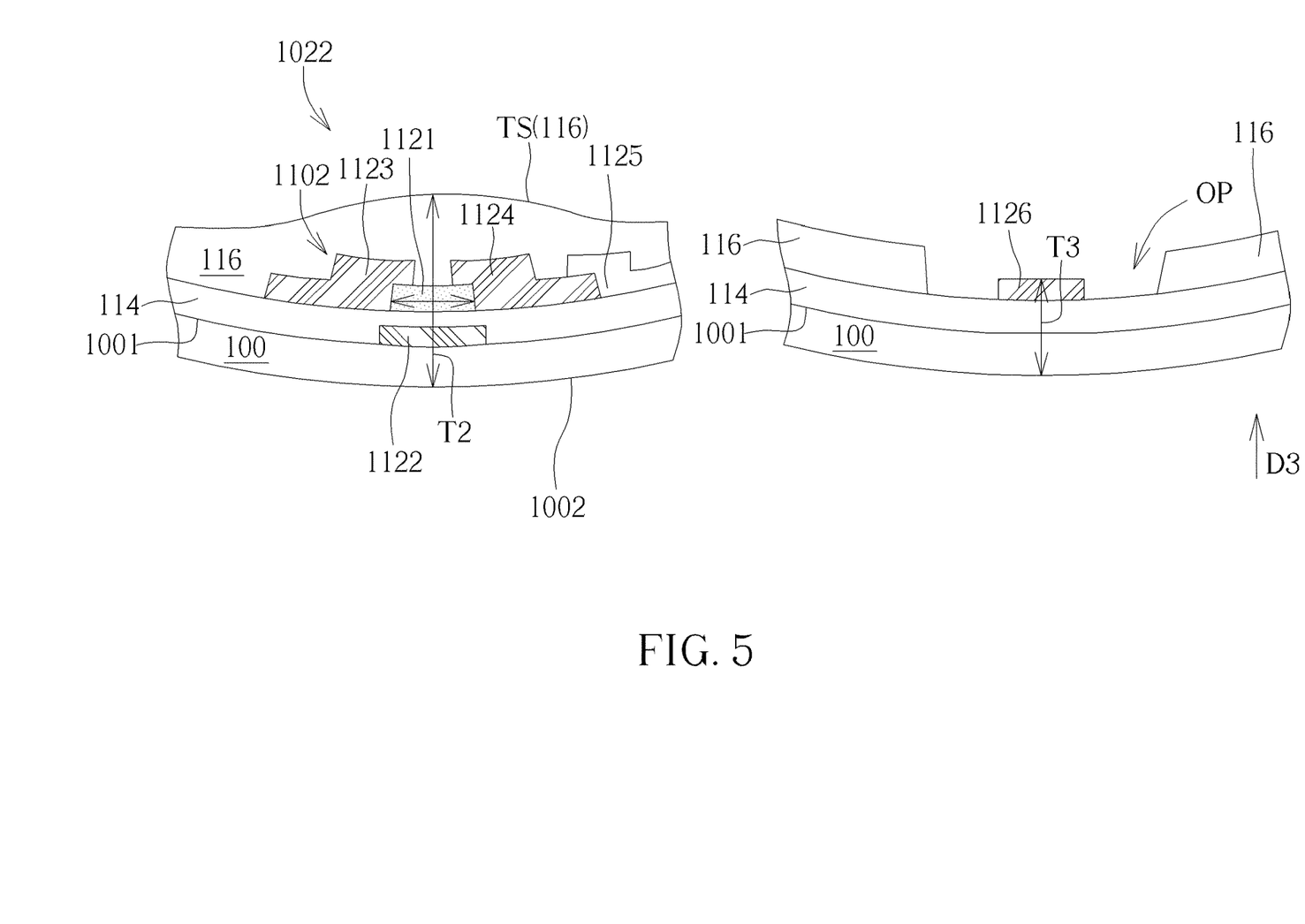
FIG. 5 is a schematic diagram illustrating a cross-sectional view corresponding to part of the longitudinal side edge, and a cross-sectional view corresponding to part of the horizontal side edge.

Referring to FIG. 5, it is a schematic diagram illustrating a cross-sectional view corresponding to part of the longitudinal side edge LS, and a cross-sectional view corresponding to part of the horizontal side edge SS. A second transistor 1102 may be disposed corresponding to or adjacent to part of the longitudinal side edge LS, the second transistor 1102 (shown in FIG. 5) may be similar to the second transistor 1102 (shown in FIG. 2), and it is not redundantly described herein. A bonding pad 1126 may be disposed corresponding to part of the horizontal side edge SS, one of the source driving units 104 (not shown in FIG. 5) may be electrically connected to (or bonded with) the bonding pad 1126, and the source driving units 104 may be a chip on film (COF) structure (not shown in FIG. 5), but not limited thereto. The bonding pad 1126 may be disposed on the gate insulating layer 114, the protection layer 116 may have an opening OP, and the bonding pad 1126 may correspond to (or overlap with) the opening OP in the third direction D3, or the bonding pad 1126 may be exposed from the opening OP of the protection layer 116, A thickness T3 corresponding in the third location is defined from the bottom surface of the substrate 100 to the top surface of the bonding pad 1126 in the third direction D3, and the thickness T2 may be greater than the thickness T3, but not limited thereto. The thickness T3 may be a maximum thickness measured from a local SEM image, and the local SEM image shows at least one bonding pad 1126, which is exposed from the opening OP of the protection layer 116, but not limited thereto.

The technical features in different embodiments described in this disclosure can be replaced, recombined, or mixed. For making it easier to compare the difference between these embodiments, the following description will detail the dissimilarities among different embodiments and the identical features will not be redundantly described.

Figure 6:
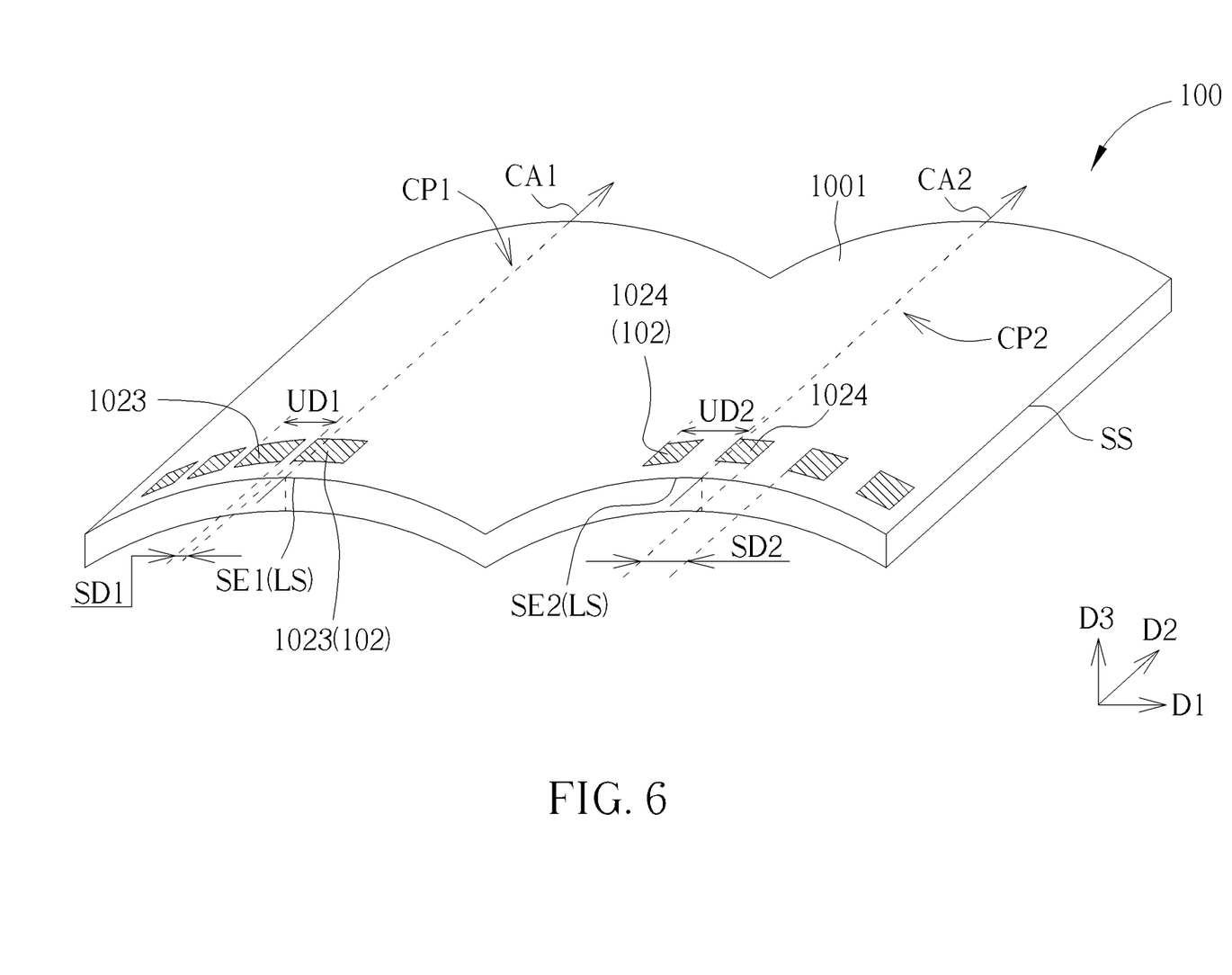
FIG. 6 is a schematic diagram illustrating a substrate of a display device according to a second embodiment.

Referring to FIG. 6, it is a schematic diagram illustrating a substrate of a display device according to a second embodiment. In order to clearly present the gate driving units 102, the display device omits the other elements disposed on the substrate 100. Different from the first embodiment, the first curved portion CP1 and the second curved portion CP2 have the same curving direction. In some embodiments, the first curved side edge SE1 and the second curved side edge SE2 may be portions of one of the longitudinal side edges LS, at least one of the longitudinal side edges is in m shape, or the shape of at least one of the longitudinal side edges LS may be similar to "m" in the second direction D1, but not limited. In some embodiments (such as FIG. 6), the shape of at least one of the horizontal side edges SS may be similar to "-" in the second direction D2, but not limited thereto. In some embodiments (such as FIG. 6), the gate driving units 102 may be arranged in a manner having at least two unit distances, and the at least two unit distances are different. The unit distance may be a pitch between two adjacent gate driving units, the unit distance may be defined as a distance between a center location of one gate driving unit and a center location of an adjacent gate driving unit in an arranging direction of the gate driving units 102, but not limited thereto. In some embodiments, the gate driving units may have similar structures, and the pitch may be calculated from a location in one of the gate driving units to the same location (such as center location or side edge) in the adjacent gate driving unit, but not limited thereto. For example, two adjacent gate driving units 1023 may have a unit distance UD1, two adjacent gate driving units 1024 may have a unit distance UD2, and the unit distance UD1 is different from the unit distance UD2. In some embodiments (such as FIG. 6), the unit distance UD1 may be less than the unit distance UD2, but not limited thereto. In some embodiments (not shown), the unit distance UD1 may be greater than the unit distance UD2. In some embodiments (such as FIG. 6), the gate driving units 102 may be arranged in a manner having at least two space distances. The space distance between two adjacent gate driving units 102 may be defined as a minimum distance between two adjacent gate driving units in the arranging direction of the gate driving units 102. For example (FIG. 6), two adjacent gate driving units 1023 may have a space distance SD1, two adjacent gate driving units 1024 may have a space distance SD2, and the space distance SD1 is different from the space distance SD2. In some embodiments (such as FIG. 6), the space distance SD1 may be less than the space distance SD2, but not limited thereto.

As shown in FIG. 6, the gate driving units 1023 may be disposed in the first curved portion CP1, and the gate driving units 1024 may be disposed in the second curved portion CP2. In some embodiments (such as FIG. 3), the gate driving units 102 in the curved portion having tensile stress may have the greater unit distance, and the gate driving units 102 in the curved portion having compressive stress may have the lesser unit distance, but not limited thereto. In some embodiments (not shown), a unit distance of the gate driving units 102 in the curved portion having tensile stress may be the same as or different from a unit distance of the gate driving units 102 in the curved portion having compressive stress.

Figure 7:
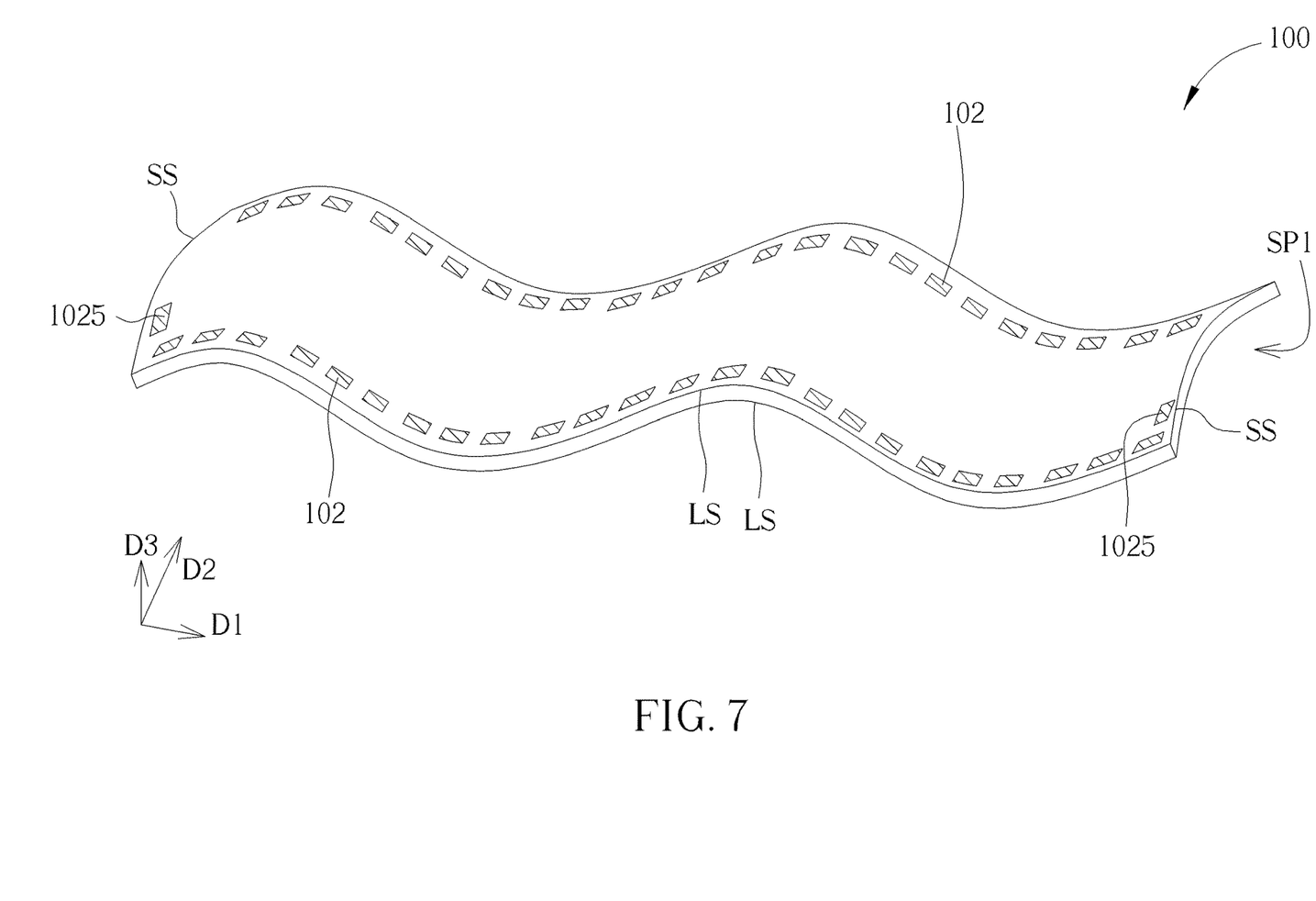
FIG. 7 is a schematic diagram illustrating a substrate of a display device according to a third embodiment.

Referring to FIG. 7, it is a schematic diagram illustrating a substrate of a display device according to a third embodiment. In order to clearly present the gate driving units 102, the curved display device omits the other elements disposed on the substrate 100. Different from the first embodiment, at least one of the longitudinal side edges LS is in wave shape, or the shape of at least one of the longitudinal side edges LS may be similar to a wave, but not limited thereto. In some embodiments (such as FIG. 7), a portion of the gate driving units 102 may be disposed along (or adjacent to) one of the longitudinal side edges LS, and another portion of the gate driving units 102 may be disposed along (or adjacent to) another of the longitudinal side edges LS, but not limited thereto. In some embodiments (such as FIG. 7), a portion of the gate driving units (such as the gate driving units 1025) may be disposed along (or adjacent to) at least one of the horizontal side edges SS different from the longitudinal side edge LS. Since a portion of the gate driving units 1025 may be adjusted to be disposed along (or adjacent to) at least one of the horizontal side edges SS, the number of the gate driving units disposed along (or adjacent to) the at least one of the longitudinal side edges LS may be reduced, or the width of the peripheral region PR may be reduced. In some embodiments (such as FIG. 7), the number of the gate driving units 102 disposed along (or adjacent to) the longitudinal side edge LS (inducing the curved side edges) having greater curvature (smaller radius of curvature) is greater than the number of the gate driving units 102 disposed along (or adjacent to) the horizontal side edge SS having smaller curvature (greater radius of curvature), but not limited thereto.

Figure 8:
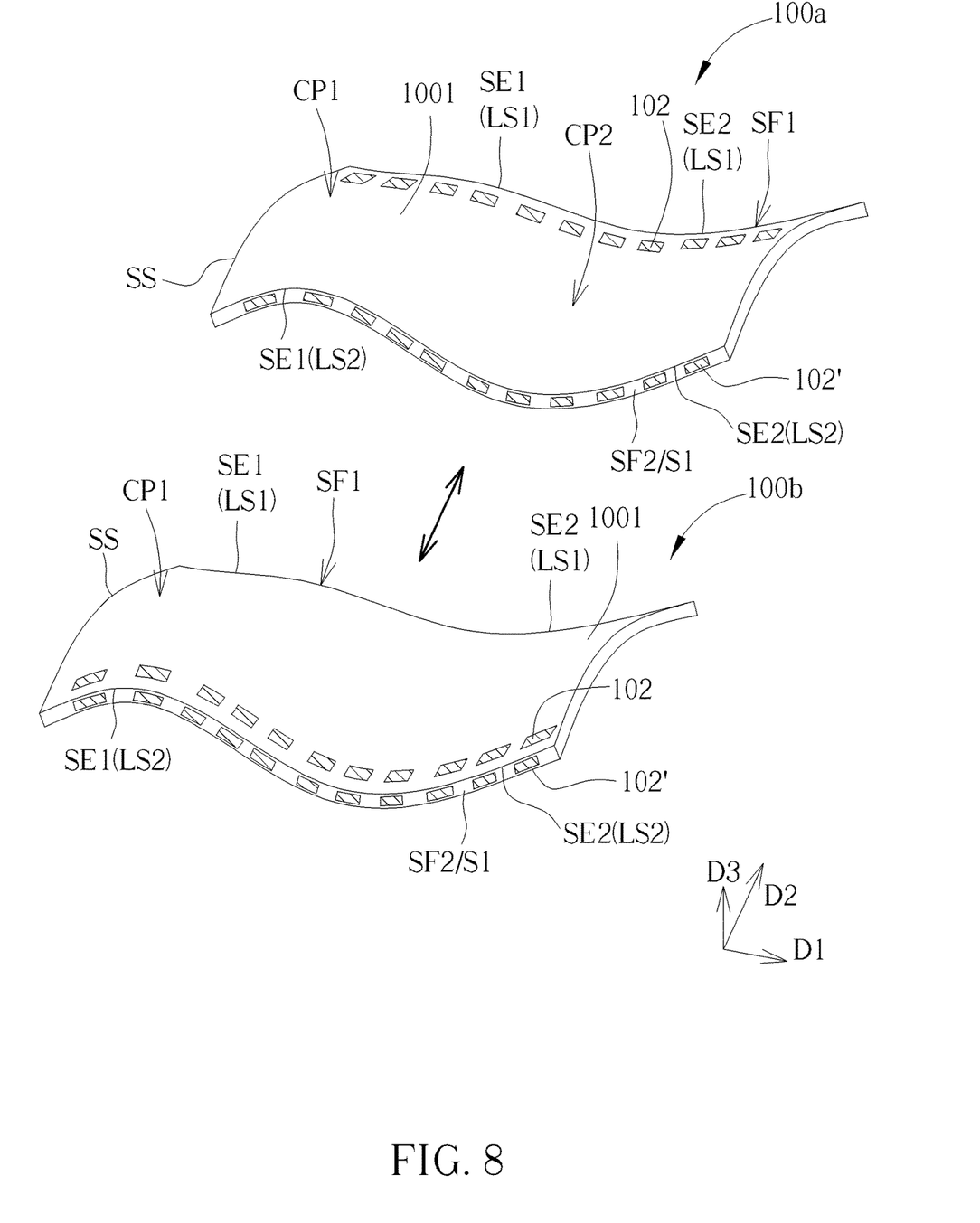
FIG. 8 is a schematic diagram illustrating substrates of a display device according to a fourth embodiment.

FIG. 8 is a schematic diagram illustrating substrates of a display device according to a fourth embodiment. In order to clearly present the gate driving units 102, the curved display device omits the other elements disposed on substrate 100a and 100b. Different from the first embodiment, the display device (in FIG. 8) may be a tiled display device, the tiled display device may include a plurality of substrates (such as a substrate 100a and a substrate 100b), but the number of substrates is not limited. Additionally, a portion of the gate driving units 102' may be disposed on the side surface S1 of the substrate 100a (or 100b), and another portion of the gate driving units 102 may be disposed on the top surface 1001 of the substrate 100a (or 100b). As shown in FIG. 8, the substrate 100a (and the substrate 100b) may respectively include a side surface SF1 and a side surface SF2 disposed opposite to the side surface SF1, the side surface SF1 includes two first longitudinal side edges LS1, and the side surface SF2 includes two second longitudinal side edges LS2, but not limited thereto. As shown in FIG. 8, the top surface 1001 may be connected between the side surface SF1 and the side surface SF2, or the side surface SF1 (or the side surface SF2) may be connected between the top surface 1001 and the bottom surface 1002 (which is opposite to the top surface 1001, not shown in FIG. 8), but not limited thereto. As shown in FIG. 8, the second longitudinal side edge LS2 of the substrate 100a may be adjacent to the first longitudinal side edge LS1 of the substrate 100b, but not limited thereto. In some embodiments, the side surface SF2 of the substrate 100a may be adhered to (or in contact with) the side surface SF1 of the substrate 100b, but not limited thereto. As shown in FIG. 8, a portion of the gate driving units 102 may be disposed on the top surface 1001 (or the bottom surface 1002) along (or adjacent to) the first curved side edge SE1 (and/or the second curved side edge SE2) of the first longitudinal side edge LS1 of the substrate 100a, and/or a portion of the gate driving units 102' may be disposed on the side surface SF2 (or the side surface SF1), which may be disposed along (or adjacent to) the first curved side edge SE1 (and/or the second curved side edge SE2) of the second longitudinal side edge LS2 of the substrate 100a. As shown in FIG. 8, a portion of the gate driving units 102 may be disposed on the top surface 1001 (or the bottom surface 1002), which may be dispose along (or adjacent to) the first curved side edge SE1 (and/or the second curved side edge SE2) of the second longitudinal side edge LS2 of the substrate 100b, and/or a portion of the gate driving units 102' may be disposed on (or adjacent to) the side surface SF2 (or the side surface SF1), which may be disposed along (or adjacent to) the first curved side edge SE1 (and/or the second curved side edge SE2) of the second longitudinal side edge LS2 of the substrate 100b, but not limited thereto. In some embodiments (not shown), a portion of the gate driving units 102' may be disposed on the side surface SF1, which may be disposed along (or adjacent to) the first curved side edge SE1 (and/or the second curved side edge SE2) of the first longitudinal side edge LS1 of the substrate 100a (and/or the substrate 100b), but not limited thereto.

In some embodiments, the side surface SF1 and/or side surface SF2 may include other components (not shown) formed thereon, such as electrodes, conductive lines, circuits, fan-out structures, demultiplexer (DEMUX) structures, or other components, but not limited thereto.

Figure 9:
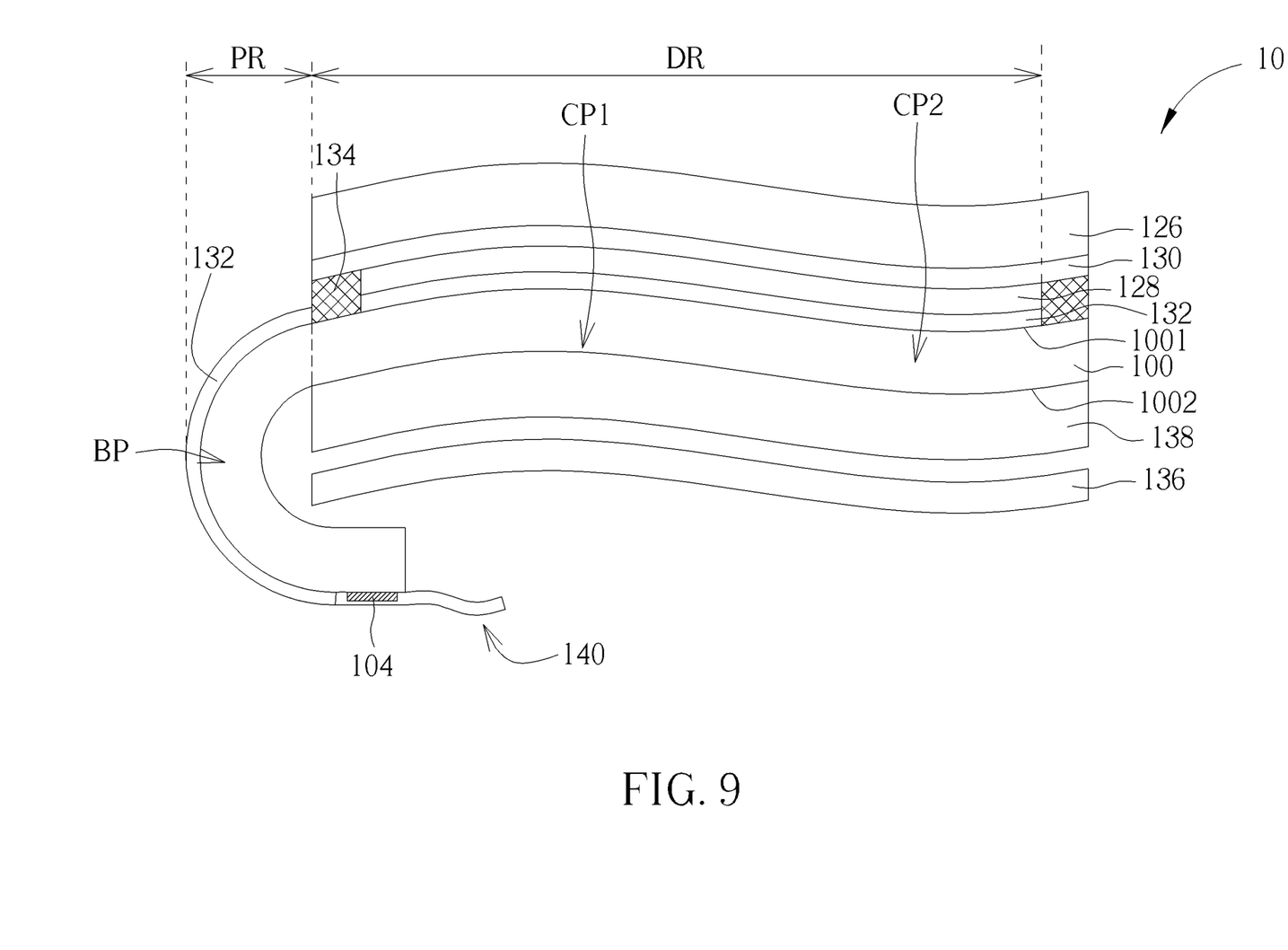
FIG. 9 is a schematic diagram illustrating a cross-sectional view of a display device according to a fifth embodiment.
Figure 10:
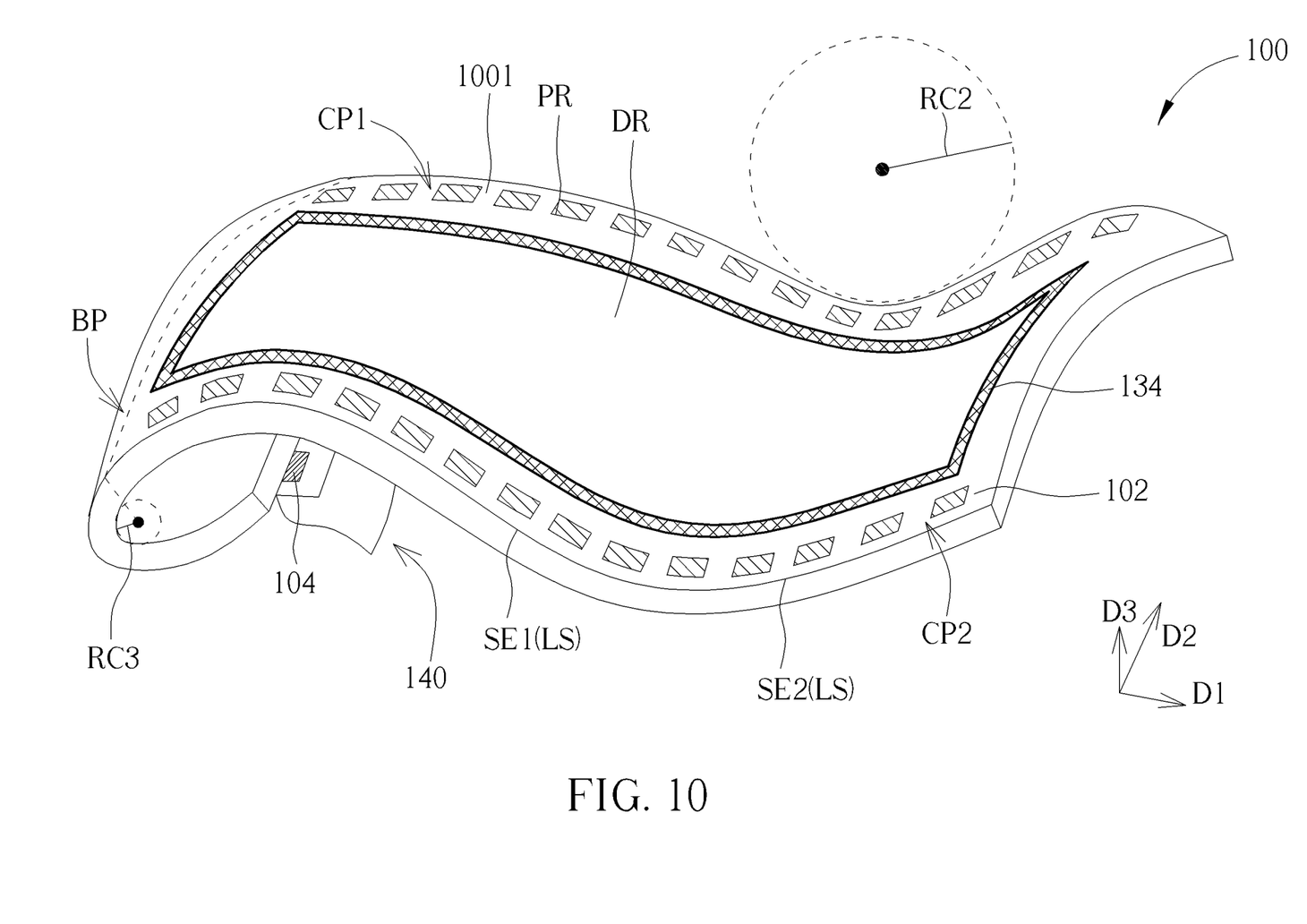
FIG. 10 is a schematic diagram illustrating a substrate of the display device according to the fifth embodiment.
Figure 11:
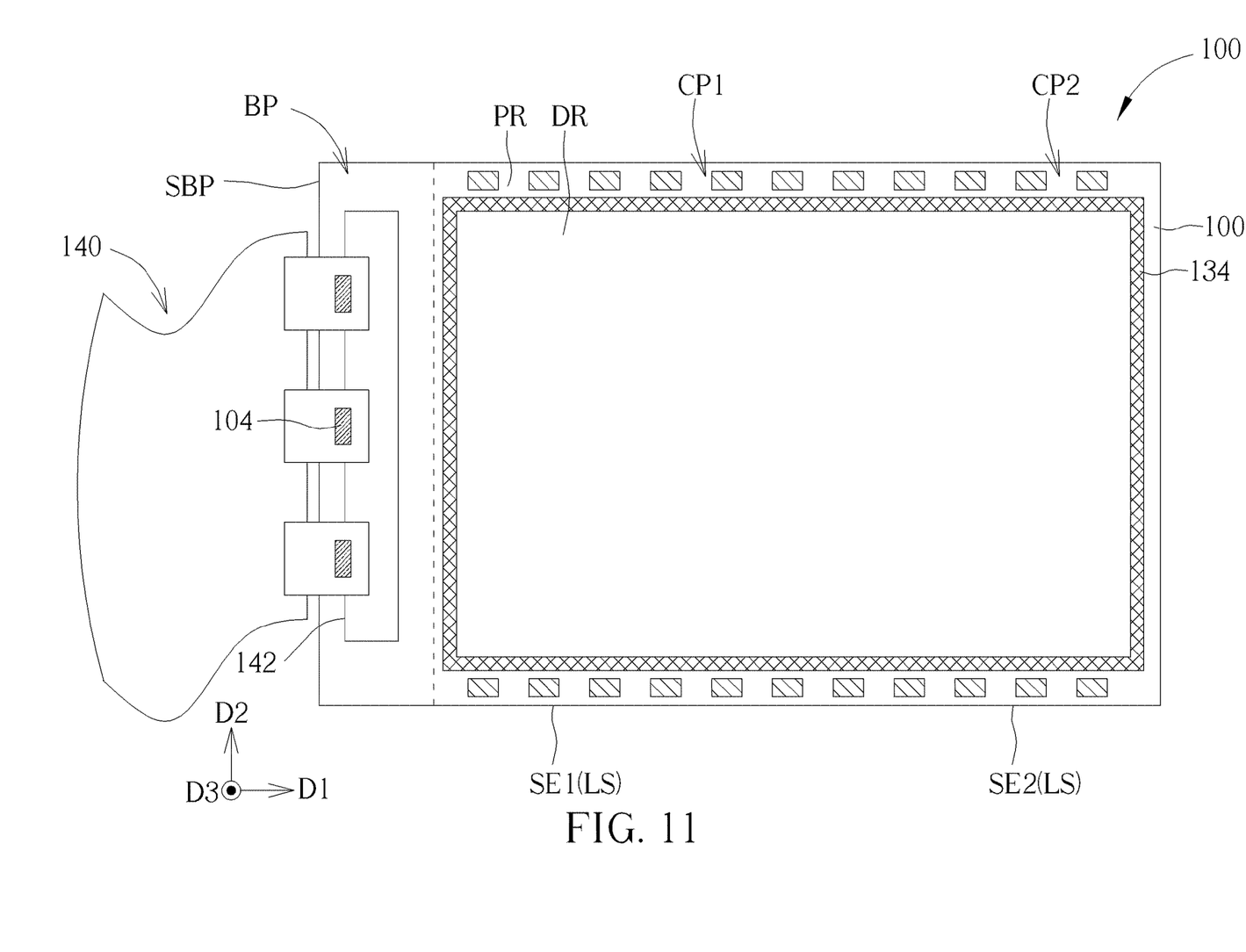
FIG. 11 is a schematic diagram illustrating a top view of the substrate of the display device according to the fifth embodiment.

Referring to FIG. 9 to FIG. 11, FIG. 9 is a schematic diagram illustrating a cross-sectional view of a display device according to a fifth embodiment, FIG. 10 is a schematic diagram illustrating a substrate of the display device according to the fifth embodiment, and FIG. 11 is a schematic diagram illustrating a top view of the substrate of the display device according to the fifth embodiment. A display device 10 shown in FIG. 9 may be a LCD device, but not limited thereto. The display device 10 may include a second substrate 126 (such as a color filter substrate or a cover substrate), a display medium layer 128, a color filter layer 130, a circuit layer 132, a sealant 134, a backlight unit 136, a support layer 138, and the substrate 100, but not limited thereto. The second substrate 126 may be disposed opposite to the substrate 100, and the material of the second substrate 126 may be similar to or different from the material of the substrate 100. In some embodiments, the material of the second substrate 126 may include a rigid substrate (such as a glass substrate or a quartz substrate) or a flexible substrate (such as a plastic substrate), but not limited thereto. The material of the plastic substrate may include polyimide (PI), polycarbonate (PC), or polyethylene terephthalate (PET), but not limited thereto. The display medium layer 128 may be disposed between the substrate 100 and the second substrate 126, the display medium layer 128 may include the liquid crystal layer, but not limited thereto. The color filter layer 130 may be disposed between the display medium layer 128 and second substrate 126. The circuit layer 132 may be disposed between the display medium layer 128 and the substrate 100, and the circuit layer 132 may include signal lines (e.g. gate lines 108, data lines 120, reset lines, bias lines, reference lines, or other signal lines, but not limited thereto), the gate driving units 102, switch elements of sub-pixels, or other elements, but not limited thereto. The backlight unit 136 may be disposed under the substrate 100, and the substrate 100 may be disposed between the display medium layer 128 and the backlight unit 136. The backlight unit 136 may be the edge-lit type backlight module or direct-lit type backlight module. Additionally, the support layer 138 may be disposed between the substrate 100 and the backlight unit 136, but not limited thereto.

In some embodiments, the support layer 138 may include a material having a preferable temperature resistance (for example, a small change in expansion at a high temperature) or humidity resistance (for example, a small change in water absorption in a high humidity), but not limited thereto. In some embodiments, the support layer 138 may include a material having support characteristics or high hardness characteristics. In some embodiments, the support layer 138 may have a first Young's coefficient, the substrate 100 may have a second Young's coefficient. In some embodiments, the first Young's coefficient may be greater than the second Young's coefficient. In some embodiments, a ratio of the first Young's coefficient to the second Young's coefficient may be in a range between 10 and 150 (10≤ratio≤150), but not limited thereto. In some embodiments, a ratio of the thickness of the support layer 138 to the thickness of the substrate 100 may be in a range between 8 and 50 (8≤ratio≤50), the thickness of the above element may be defined as a maximum thickness in third direction D3. It should be noted that, the above thickness of the above elements (such as the support layer 138 or the substrate 100) can be measured from a maximum thickness of a partial image by SEM, but not limited thereto.

As shown in FIG. 9 to FIG. 11, the sealant 134 may be disposed between the second substrate 126 and the substrate 100, and the sealant 134 may be disposed in the peripheral region PR, but not limited thereto. The peripheral region PR may be adjacent to (or surround) a display region DR, and the display region DR includes a plurality of pixels (not shown). In some embodiments (FIG. 9-FIG. 11), the peripheral region PR and the display region DR may defined by the sealant 134, but not limited thereto. In some embodiments, the substrate 100 may include a bend portion BP bending to be overlapped with other part of the substrate 100 in the third direction D3. In some embodiments, the bending portion BP may be overlapped with the backlight unit 136, but is not limited thereto. In some embodiments, the bending portion BP may be in the peripheral region PR, but is not limited thereto. In some embodiments, the first curved portion CP1 and the second portion CP2 may be in the peripheral region PR and/or the display region DR. As shown in FIG. 9, the circuit layer 132 may be extended to the bend portion BP, but not limited thereto. Accordingly, some peripheral electronic components disposed on the bend portion BP may not occupy the display region DR. In some embodiments, the source driving units 104 may be disposed on the bend portion BP. In some embodiments, at least one source driving unit 104 is one of integrated circuit (IC), thin film transistor, and chip on film structure, but not limited thereto. It should be noted that, FIG. 10 to FIG. 11 may omit some components (or elements), such as the cover layer 126 (and/or color filter substrate), the display medium layer 128, the color filter layer 130, the circuit layer 132, the backlight unit 136 or the support layer 138.

In some embodiments (FIG. 10), a radius of curvature of the at least one curved portion (such as the second curved portion CP2) is greater than a radius of curvature of the bend portion BP As shown in FIG. 10, the curvatures of the first curved portion CP1 (and/or the second curved portion CP2) may be less than a curvature of the bend portion BP. As shown in FIG. 10, the radius of curvature RC2 of the second curved portion CP2 may be greater than a radius of curvature RC3 of the bend portion BP, or the radius of curvature RC1 (not shown) of the first curved portion CP1 may be greater than the radius of curvature RC3 of the bend portion BP. For example, the radius of curvature RC2 (or the radius of curvature RC1) and the radius of curvature RC3 may satisfy the condition: 10RC3≤RC2 (or RC1)≤1000RC3, but not limited thereto. In some embodiments, the radius of curvature RC1 or the radius of curvature RC2 may be less than or equal to 100 millimeters for reducing the splitting (or cracking) chance of the sealant 134, but not limited thereto.

As shown in FIG. 11, the source driving units 104 may be disposed on the bend portion BP, and the source driving units 104 may be disposed along (or adjacent to) the horizontal side edge SS, but not limited thereto. In some embodiments (such as FIG. 11), the source driving units 104 may be the COF structure, and the source driving units 104 may be bonded on a connecting area 142, and some bonding pad (not shown) disposed in the connecting area 142 of the peripheral region PR, but not limited thereto. In some embodiments (such as FIG. 11), the display device 100 may include a circuit board 140, and the circuit board 140 may be electrically connected to the source driving units 104 and/or the gate driving units 160, but not limited thereto.

In summary, the plurality of gate driving units may be disposed along (or adjacent to) at least one of the curved side edges (such a portion of the longitudinal side edge) of the substrate, at least one source driving unit may be disposed along (or adjacent to) at least one of the horizontal side edges different from the longitudinal side edge, at least one of the gate lines may be extend along a the direction approximately parallel to at least one of the horizontal side edges, and at least one of the date lines may be extend along the direction approximately parallel to the longitudinal side edge (including the first curved side edge or the second curved side edge), and the curvature of at least one of the horizontal side edges is less than the curvature of at least one of the curved side edges. In some cases, the electric charging ability of the source driving unit may be greater than the electric charging ability of the gate driving unit, the electric charging ability of the source driving unit can compensate for the degradation of the signal transmission quality of the data line when the data line have greater curvature. Also, since the gate line has smaller curvature, the signal transmission quality of the gate line can be maintained.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device, comprising:
   a substrate having:
      a top surface being curved;
      a first side edge extending in a first extension direction; and
      a second side edge extending in a second extension direction different from the first extension direction,
      wherein a curvature of the first side edge is greater than a curvature of the second side edge, and the curvature of the second side edge is not equal to zero,
   a plurality of gate driving units disposed along the first side edge;
   a plurality of source driving units disposed along the second side edge;
   a gate line disposed on the substrate and electrically connected to one of the plurality of gate driving units; and
   a data line disposed on the substrate and electrically connected to one of the plurality of source driving unit,
   wherein a curvature of the gate line is less than a curvature of the data line, and the curvature of the gate line is not equal to zero.

2. The display device of claim 1, wherein the first side edge is in s shape.

3. The display device of claim 1, wherein the first side edge is in m shape or wave shape.

4. The display device of claim 1, wherein the plurality of gate driving units are arranged in a manner having at least two unit distances.

5. The display device of claim 1, wherein the plurality of gate driving units are arranged in a manner having at least two space distances.

6. The display device of claim 1, wherein one of the plurality of gate driving units is one of integrated circuit, thin film transistor and chip on film structure.

7. The display device of claim 1, wherein one of the plurality of gate driving units comprises at least one thin film transistor.

8. The display device of claim 1, wherein one of the plurality of source driving units is one of integrated circuit, thin film transistor and chip on film structure.

9. The display device of claim 1, wherein the substrate comprises:
   a first curved portion having a first curved side edge, wherein the first curved side edge is a portion of the first side edge; and
   a second curved portion having a second curved side edge, wherein the first curved portion has a convex surface, the second curved portion has a concave surface, and the second curved side edge is another portion of the first side edge.

10. The display device of claim 9, comprising:
    a first gate driving unit disposed adjacent to the first curved side edge, wherein the first gate driving unit comprising a first transistor; and
    a second gate driving unit disposed adjacent to the second curved side edge, wherein the second driving unit comprising a second transistor,
    wherein an area of a channel of the first transistor is different from an area of a channel of the second transistor.

11. The display device of claim 10, wherein the area of the channel of the first transistor is greater than the area of the channel of the second transistor.

12. The display device of claim 1, wherein the substrate comprises a side surface, and the plurality of gate driving units are disposed on the side surface or the top surface.

13. The display device of claim 1, wherein the substrate comprises:
    a bend portion, wherein a radius of curvature of the first side edge is greater than a radius of curvature of the bend portion.

14. The display device of claim 13, wherein at least one of the plurality of source driving units is disposed on the bend portion.

15. The display device of claim 13, further comprising:
    a circuit layer disposed on the substrate and extended to the bend portion.

16. A tiled display device, comprising:
    a first substrate having:
       a first top surface being curved;
       a first side edge extending in a first extension direction; and
       a second side edge extending in a second extension direction different from the first extension direction,
       wherein a curvature of the first side edge is greater than a curvature of the second side edge, and the curvature of the second side edge is not equal to zero;
    a second substrate having:
       a second top surface being curved;
       a third side edge extending in a third extension direction; and
       a fourth side edge extending in a fourth extension direction different from the third extension direction,
       wherein a curvature of the third side edge is greater than a curvature of the fourth side edge, and the curvature of the fourth side edge is not equal to zero;
    a plurality of gate driving units disposed along the first side edge of the first substrate or the third side edge of the second substrate,
    a plurality of source driving units disposed along the second side edge of the first substrate or the fourth side edge of the second substrate;
    a gate line disposed on the first substrate or the second substrate and electrically connected to one of the plurality of gate driving units; and
    a data line disposed on the first substrate or the second substrate and electrically connected to one of the plurality of source driving unit,
    wherein a curvature of the gate line is less than a curvature of the data line, and the curvature of the gate line is not equal to zero.

17. A display device, comprising:
    a substrate having:
       a top surface being curved;
       a first side edge extending in a first extension direction; and
       a second side edge extending in a second extension direction different from the first extension direction,
       wherein a curvature of the first side edge is greater than a curvature of the second side edge, and the curvature of the second side edge is not equal to zero;

a plurality of gate driving units disposed along the first side edge, wherein the plurality of gate driving units are arranged in a manner having at least two unit distances;
a plurality of source driving units disposed along the second side edge;
a gate line disposed on the substrate and electrically connected to one of the plurality of gate driving units; and
a data line disposed on the substrate and electrically connected to one of the plurality of source driving unit, wherein a curvature of the gate line is less than a curvature of the data line, and the curvature of the gate line is not equal to zero.

* * * * *